United States Patent
Watanabe et al.

(10) Patent No.: US 7,619,826 B2
(45) Date of Patent: Nov. 17, 2009

(54) DISPLAY DEVICE FOR VEHICLE

(75) Inventors: Takeyoshi Watanabe, Shizuoka (JP); Go Nakamura, Shizuoka (JP); Tetsuya Sugiyama, Shizuoka (JP); Koji Nomura, Aichi (JP); Masahiro Takamatsu, Aichi (JP); Hitoshi Kumon, Aichi (JP)

(73) Assignees: Yazaki Corporation, Tokyo (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/068,661

(22) Filed: Feb. 8, 2008

(65) Prior Publication Data

US 2008/0192358 A1      Aug. 14, 2008

(30) Foreign Application Priority Data

Feb. 13, 2007   (JP)   ............... 2007-031921

(51) Int. Cl.
G02B 27/14 (2006.01)
G09G 5/00 (2006.01)
H04N 7/00 (2006.01)

(52) U.S. Cl. ............... 359/630; 345/7; 348/115
(58) Field of Classification Search ......... 359/630–634, 359/13–14; 345/7, 9; 348/115; 349/11; 353/11–12, 28, 119; 340/438, 980, 995.1, 340/815.47, 815.74
See application file for complete search history.

(56) References Cited

U.S. PATENT DOCUMENTS

| | | | |
|---|---|---|---|
| 4,978,214 A | 12/1990 | Kawata et al. | |
| 5,386,216 A * | 1/1995 | Iino | ............... 345/7 |
| 6,563,649 B2 * | 5/2003 | Furuya | ............... 359/630 |
| 2004/0239583 A1 * | 12/2004 | Shelton et al. | ............... 345/7 |
| 2008/0049331 A1 | 2/2008 | Nakamura et al. | |

FOREIGN PATENT DOCUMENTS

| | | |
|---|---|---|
| DE | 10139057 | 4/2002 |
| DE | 102005012011 | 9/2006 |

(Continued)

OTHER PUBLICATIONS

Office Action dated Jun. 20, 2008, issued on the counterpart German application and its partial translation.

Primary Examiner—Scott J Sugarman
Assistant Examiner—Dawayne A Pinkney
(74) Attorney, Agent, or Firm—Kratz, Quintos & Hanson, LLP (57) ABSTRACT

A display device for a vehicle is provided, by which an attaching position thereof can be altered depending upon an attachment limiting condition of the vehicle. The display device includes: a display source provided in an instrument panel of the vehicle; and a prism provided on a light path between the display source and an aperture of the instrument panel and refracting display light of an image displayed on the display source backward in the vehicle, wherein the prism is formed in a shape inclined upward in a backward direction of the vehicle, wherein (a) a virtual image of the image projected on a projection area of a windshield of the vehicle, onto which area the display image from the prism is projected and (b) a front view of the vehicle to be seen from an eye point of the vehicle through the windshield are seen in a superimposed manner.

4 Claims, 5 Drawing Sheets

FOREIGN PATENT DOCUMENTS

| | | |
|---|---|---|
| DE | 10 2007 035 255 | 2/2008 |
| JP | 02-164621 | 6/1990 |
| JP | 03-209210 | 9/1991 |
| JP | 08-085363 | 4/1996 |
| JP | 2000-187181 | 7/2000 |
| JP | 2004-219859 | 8/2004 |
| JP | 2005-156678 | 6/2005 |

* cited by examiner

DISPLAY DEVICE FOR VEHICLE

BACKGROUND OF THE INVENTION (1) Field of the Invention

The present invention relates to a display device for a vehicle, in which (a) a virtual image of an image projected on a projection area of a windshield of the vehicle, onto which area the image displayed on a display source is reflected by a reflecting mirror and (b) a front view of the vehicle to be seen from an eye point of the vehicle through the windshield are seen in a superimposed manner.

(2) Description of the Related Art

Recently, accompanied with increment and diversification of information required by a driver during a drive of a vehicle, in order to improve visibility, a projection type display device for a vehicle being called a head up display device (HUD device) has been adopted, in which an image is displayed as a virtual image thereof on a windshield of the vehicle and subjected to be seen by the driver in a superimposed manner together with a front view of the vehicle through the windshield (see Japanese Patent Applications Laid-Open No. H2-164621, H3-209210, H8-85363, 2000-187181, 2004-219859, and 2005-156678).

Figure 4:
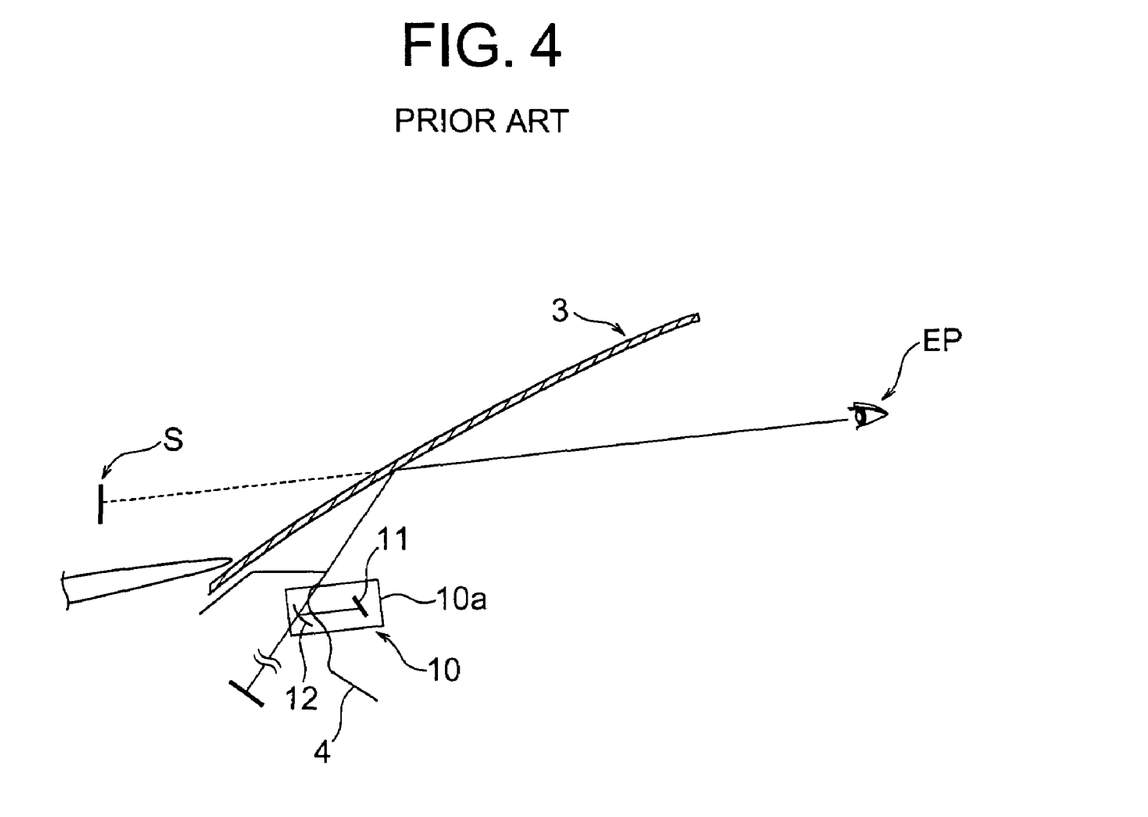
FIG. 4 illustrates an example of a primary construction of a conventional display device for a vehicle.

In FIG. 4, a display device 10 for a vehicle is manufactured as a unit receiving a display source 11 and a reflecting member 12 in a device body 10a of the display device 10. The display device 10 is arranged at the most suitable position depending upon conditions such as a position of an eye point EP of a driver of the vehicle, a display position (or distance) of a virtual image S, and attaching position and angle of a windshield 3 with respect to the vehicle.

However, in the vehicle, there may be no room for placing the display device 10 because of a vehicle body, duct, and reinforcing member, therefore when trying to place the display device 10 at the best position, a part of the device body 10a may interfere with a vehicle body 4 (particularly, with a cowl) as shown in FIG. 4, causing the placement of the display device 10 to be difficult physically.

Figure 5A:
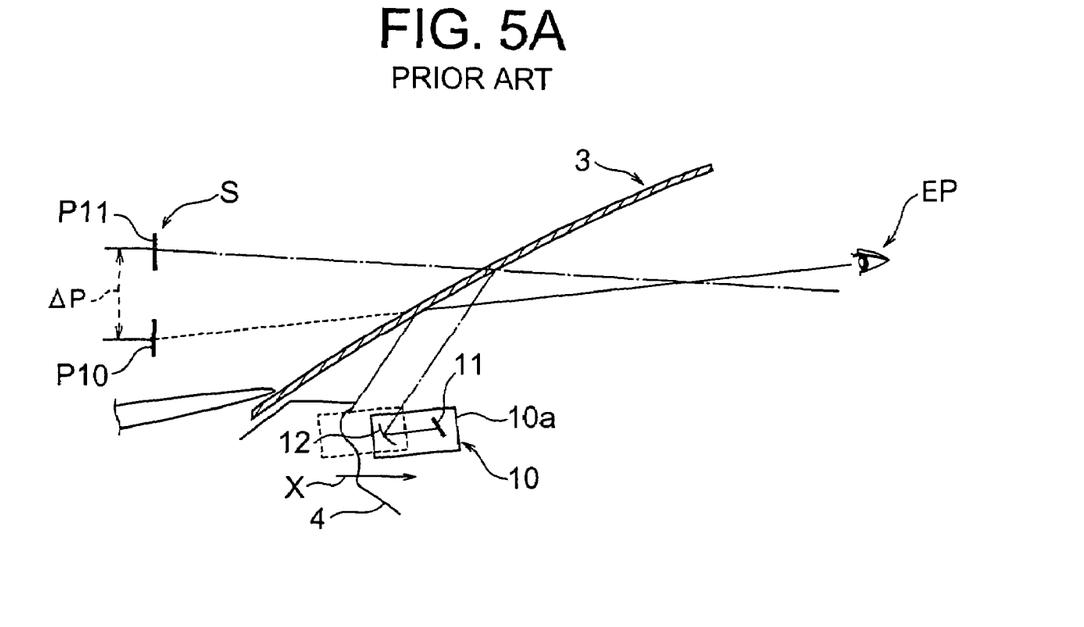
FIG. 5A illustrates a problem of a gap of a reflection point in a conventional display device for a vehicle.

For example, as shown in FIG. 5A, the device body 10a may be placed at a location such as the rear of the vehicle indicated an arrow X shown in FIG. 5A where there is a room in the vehicle. However, in such a case, since the display light from the display source 11 reflected by the reflecting member 12 is shifted from an original reflection point P1 on the windshield 3, therefore the virtual image S is shifted by a gap ΔP from the best display position P10 to a display position P11. When the gap ΔP is large, the virtual image S cannot be seen from the eye point EP and therefore, the device body 10a of the display device 10 cannot be placed at such a position.

Figure 5B:
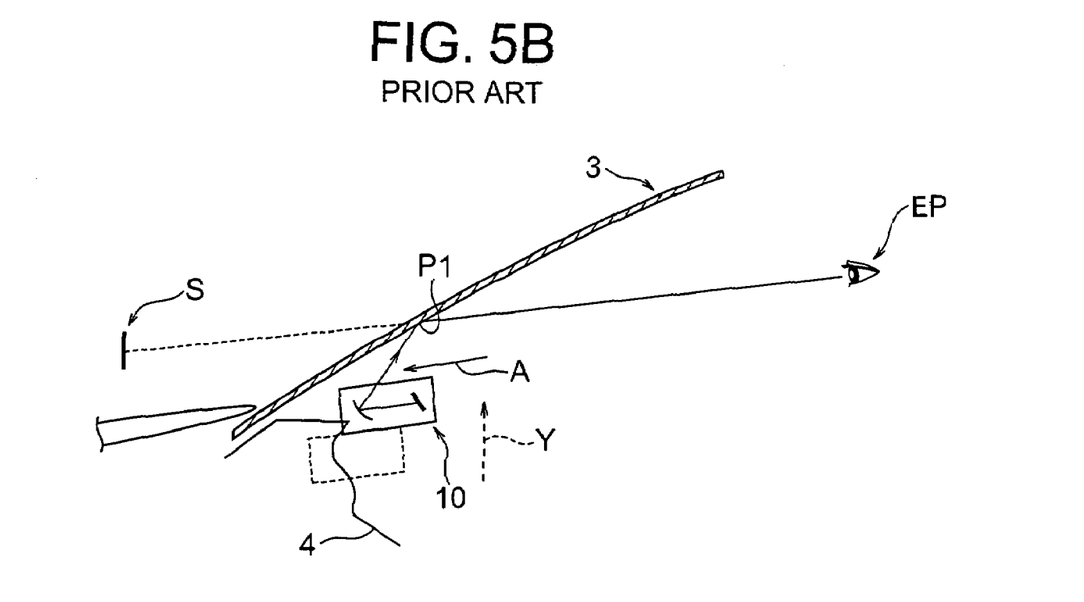
FIG. 5B illustrates a problem of obstruction of front view in a conventional display device for a vehicle.

Further, as shown in FIG. 5B, when the device body 10a is moved along an optical axis A toward the upper part Y of the vehicle, it is indeed possible to remove the problem that the display light is shifted from an original reflection point P1 on the windshield 3, however, there is a new problem that such a placement of the device body 10a may obstruct the front field of vision depending upon the condition of the vehicle. Furthermore, when a prism or the like for adjusting the light reflected by the reflecting member toward the reflection point P1 in order to remove the above problem, there is a new problem that external light such as sun light may be reflected by the prism so as to be transferred onto the windshield.

Moreover, in the HUD device described in the Japanese Patent Applications Laid-Open No. H8-85363 and 2005-156678, the display light is reflected toward the eye point by a combiner instead of the windshield, therefore there is no problem that the display light is shifted from the reflection point due to the placement of the display device. However, as for the HUD device, since a position where the combiner is placed is limited, therefore a position where the HUD device is attached cannot be altered. Accordingly, the display device cannot be mounted on the vehicle when things come to the worst depending upon an attachment limiting condition of the vehicle.

SUMMARY OF THE INVENTION

It is therefore an objective of the present invention to solve the above problem and to provide a display device for a vehicle, by which an attaching position of the device body of the display device to the vehicle can be altered depending upon an attachment limiting condition of the vehicle when the display light from the display source is to be reflected onto the windshield.

In order to attain the above objective, the present invention is to provide a display device for a vehicle including:

a display source provided in an instrument panel of the vehicle;

a prism provided on a light path between the display source and an aperture of the instrument panel and refracting display light of an image displayed on the display source backward in the vehicle; and a light shield wall facing the prism and situated in front of the prism in the vehicle, wherein the prism is formed in a shape inclined upward in a backward direction of the vehicle so that external light reflected on upper and lower surfaces of the prism goes toward the light shield wall, wherein (a) a virtual image of the image projected on a projection area of a windshield of the vehicle, onto which area the display light from the prism is projected and (b) a front view of the vehicle to be seen from an eye point of the vehicle through the windshield are seen in a superimposed manner.

With the construction described above, the prism, which refracts the display light from the display source toward a predetermined projection position of the projection area on the windshield, is provided on a light path between the display source and an aperture of the instrument panel. Therefore, an attaching position of the device body of the display device to the vehicle can be altered depending upon an attachment limiting condition of the vehicle by forming the prism in a shape corresponding to a relative position of the display source with respect to the instrument panel. Further, since the external light reflected or refracted on the upper and lower surfaces of the prism is reflected forward in the vehicle, therefore the external light can be shielded by the light shield wall without making the light shield wall high. That is, the display device for a vehicle can be placed shifted backward within the instrument panel, therefore the external light such as sun light can be prevented from going to the windshield due to the reflection by the prism. Furthermore, since the display device for a vehicle can be placed shifted backward, therefore the degree of freedom of the designing of the display device can be improved and therefore, the easiness of mounting of the display device on the vehicle can be improved. Accordingly, the display device for a vehicle can be easily mounted on various vehicles having different shapes of the instrument panel.

The display device for a vehicle further includes a reflecting member which is provided in the instrument panel and reflects the display light from the display source toward the projection area, and the prism is situated on a light path between the reflecting member and the aperture and formed so as to refract the display light toward a projection position of the projection area.

With the construction described above, since the display light reflected by the reflecting member is refracted to a predetermined projection position of the projection area by the prism provided on a light path between the aperture of the instrument panel and the reflecting member, therefore an attaching position of the device body of the display device having the reflecting member to the vehicle can be altered depending upon an attachment limiting condition of the vehicle.

The prism is provided so as to close the aperture.

With the construction described above, since the aperture of the instrument panel is closed by the prism, therefore a conventional exterior glass is not necessary any more and an attaching position of the device body of the display device to the vehicle can be altered depending upon an attachment limiting condition of the vehicle.

The prism includes an external light reflecting surface formed so as to reflect the external light passed through the windshield in a direction straying out of a course to the eye point.

With the construction described above, since the external light passed through the windshield is reflected in a direction straying out of a course to the eye point, therefore a ghost image due to the external light can be prevented from occurring and therefore, dazzling of a driver of the vehicle can be securely prevented from occurring.

DESCRIPTION OF THE PREFERRED EMBODIMENTS

In the following, the preferred embodiments of a projection type display device for a vehicle according to the present invention will be explained with reference to FIGS. 1-3.

First Preferred Embodiment

Figure 1:
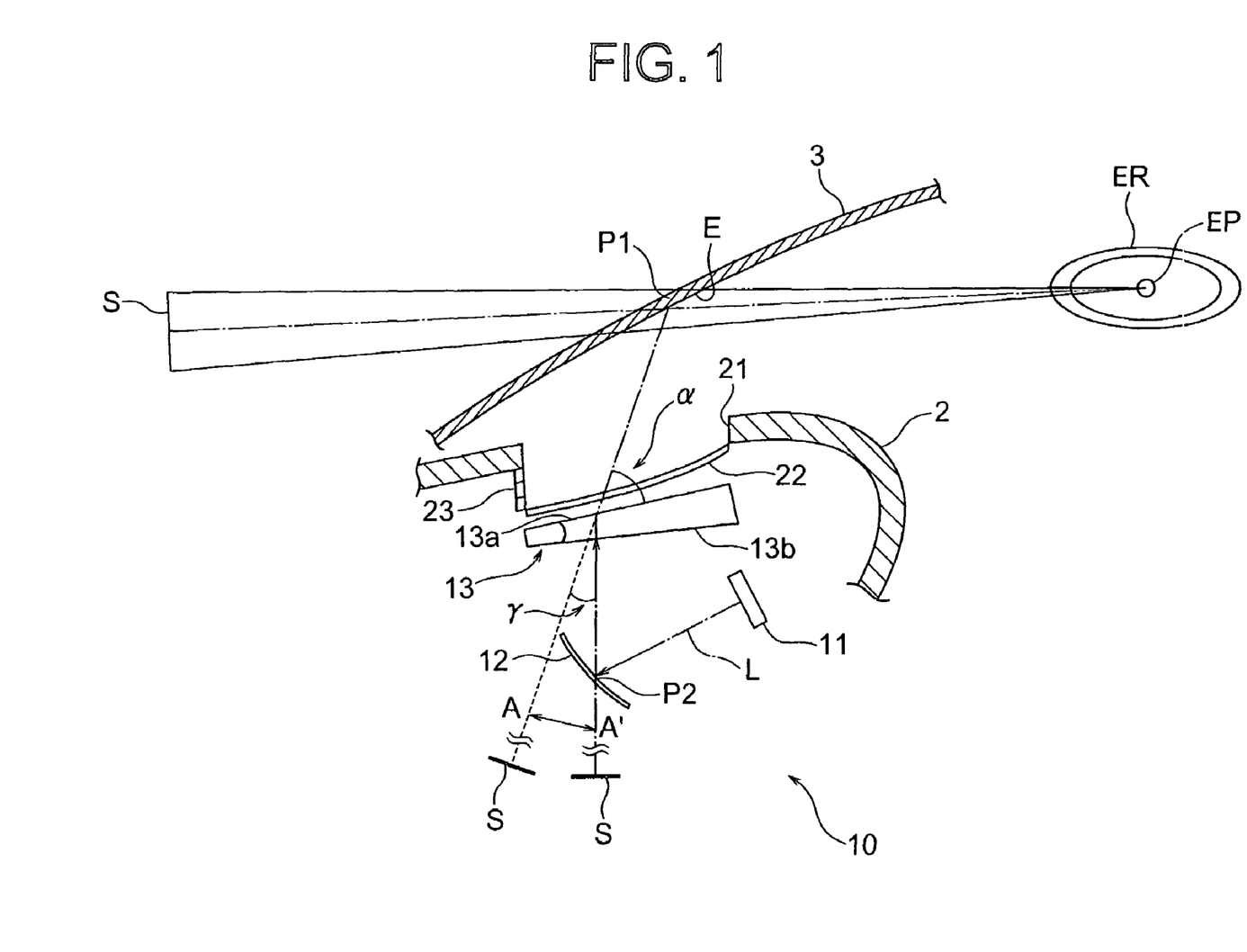
FIG. 1 illustrates a primary construction of a display device for a vehicle according to the first preferred embodiment of the present invention.
Figure 2:
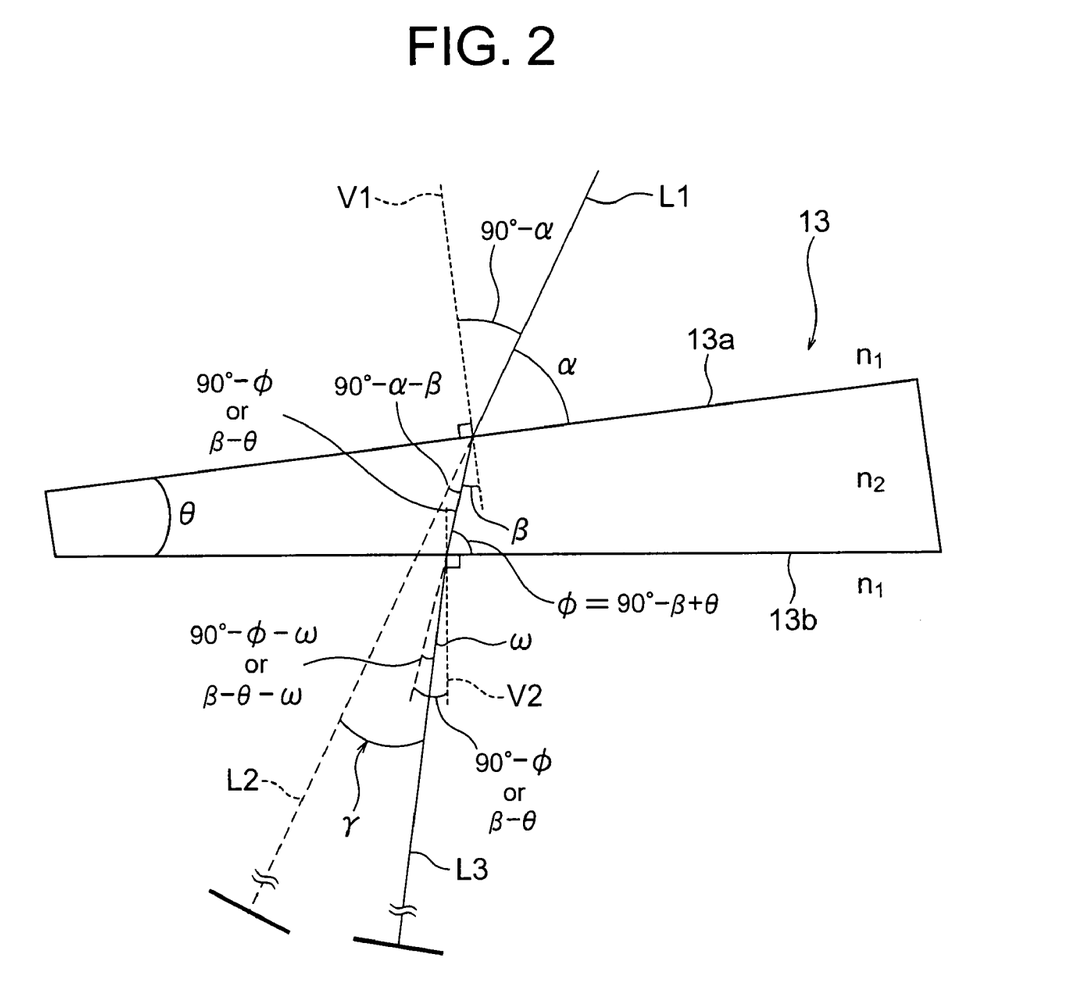
FIG. 2 illustrates an example of designing a prism shown in FIG. 1.

As shown in FIG. 1, a display device 10 for a vehicle is arranged within an instrument panel of the vehicle. The display device 10 includes a display source 11, reflecting member 12, prism 13, and light shield wall 23, all of which are received in a receiving case (not shown in FIG. 1).

The display source 11 is a display device, for example, a selfluminous device such as a field emission (FE) display, fluorescence display tube and electroluminescence (EL) display or liquid crystal display having a back light.

The reflecting member 12 is, for example, a reflecting mirror or a magnifying mirror and reflects the display light L of the image displayed on the display source 11 toward the projection area E of the windshield 3 of the vehicle by reflecting the display light L upward in the vehicle. Thus, the display source 11 and the reflecting member 12 are arranged so as to facing each other in the receiving case. The reflecting member 12 is supported by a restriction member (not shown in the figure) rotatably within a predetermined rotation range so that a reflection angle of reflection of the display light L of an image displayed by the display source 11 toward a point within an eye range ER indicating a range, within which the virtual image S can be seen, can be adjusted even when the eye point EP of the driver shifts.

In the preferred embodiment, the example in which one reflecting member 12 is provided is explained for the purpose of simplifying the explanation. However, in the present invention, there are various embodiments, for example, an embodiment in which a plurality of the reflecting members 12 are provided so as to reflect the display light L plural times, or an embodiment in which the display light L is directly projected on the windshield 3 without using the reflecting member 12.

The prism 13 according to the first preferred embodiment is formed in a shape inclined upward in a backward direction of the vehicle so that external light, such as sun light or street light, reflected on an upper surface 13a and a lower surface 13b of the prism 13 goes toward the light shield wall 23. The prism 13 is provided on a light path L between the display source 11 and an aperture 21 of the instrument panel 2 and faces a translucent exterior glass 22 which closes an aperture 21 of the instrument panel 2. The prism 13 and the exterior glass 22 are arranged in such a manner as to prevent the light from being repeatedly reflected between the upper surface 13a and the exterior glass 22 so as to go toward the eye point EP, that is, to prevent visibility from being deteriorated. Furthermore, the prism 13 is formed in a wedge-shaped being tapered so as to have a thickness thereof at the rear part thereof being larger than that at the front part thereof according to the attaching position of the display source 11 in the instrument panel 2, so that the prism 13 refracts the transmitting display light L toward a predetermined position P1 on the projection area E.

In the first preferred embodiment described above, the prism 13 is arranged between the aperture 21 and the reflecting member 12. However, in the present invention, taking a fact that the display light L is refracted by the prism 13 into consideration, the arrangement shown in FIG. 1 may be changed in such a manner that the prism 13 is arranged between the display source 11 and the reflecting member 12.

The prism 13 refracts the display light L toward the projection position P1. Specifically, the display light L is refracted so that the light entered from the prism 13 goes toward the rear side of the vehicle than the incident light entering the prism 13 goes, thereby enabling the movement from an A point which is an original position of the virtual image in the vehicle to an A' point which is located on the rear side of the vehicle. That is, since a difference in shapes of the instrument panel 2 occurring due to various vehicle types is absorbed, therefore the display device 10 can be placed at the most suitable position such as a position in the proximity of a user within the instrument panel. That is, a common display device 10 can be mounted in common to various vehicle types.

In the following, an example of a method of designing the prism 13 will be explained with reference to FIG. 2. Here, the prism 13 has a refractive index $n_2$, and an angle which the upper surface 13a forms with the lower surface 13b is θ. The surface of the prism 13 has a refractive index $n_1$.

The light L1 entered the prism 13 with an angle α goes straight in the prism 13 as light after being refracted on the upper surface 13a with an angle β with respect to the normal line V1 of the upper surface 13a. The expression thereof is $n_1 \times \sin(90-\alpha) = n_2 \times \sin\beta$ by Snell's law and therefore, is shown by the following Expression 1:

$$\beta = \sin^{-1}[n_1 \times \sin(90-\alpha)/n_2] \quad \text{(Expression 1)}.$$

The light, which goes straight in the prism 13 after being refracted on the upper surface 13a with an angle β, enters the lower surface 13b of the prism 13 with an angle φ and is refracted on the lower surface 13b with an angle ω with respect to the normal line V2 of the lower surface 13b. The expression thereof is $n_2 \times \sin(90-\phi) = n_1 \times \sin\omega$ by Snell's law and therefore, is shown by the following Expression 2:

$$\omega = \sin^{-1}[n_2 \times \sin(\beta-\theta)/n_1] \quad \text{(Expression 2)}.$$

From the Expression 1 and Expression 2, an expression of an angle γ which is formed with the straight going light L2 after entering the prism 13 with the angle α and the light L3 entered after being refracted by the prism 13 can be expressed by the following Expression 3:

$$\gamma = (90 - \alpha - \beta) + (\beta - \theta - \omega) \quad \text{(Expression 3)}$$
$$= 90 - \alpha - \theta - \sin^{-1}[n_2 \times \sin(\beta - \theta)/n_1].$$

In this connection, a value of β in the Expression 3 can be replaced by the Expression 1.

From these Expressions 1-3 and an attachable position of the display device 10 within the instrument panel 2, a shape, size and material (refractive index $n_2$) of the prism 13 are designed so that the light L1 goes toward the projection position P1 of the projection area E, and that the refracted and coming-out light L3 goes toward the reflection position P2 on the reflecting member 12.

The light shield wall 23 is formed as a frame made of plastic or metal and is arranged facing prism 13 and in front of the prism 13 so that the light shield wall 23 continues from the aperture 21 of the instrument panel 2 or so that the light shield wall 23 is a part of a bezel. A surface of the light shield wall 23 is black or the like, that is, the light shield wall 23 prevents the external light F from being reflected. The aperture 21 of the instrument panel 2 is closed by the exterior glass 22 and the light shield wall 23.

In the following, an example of action as to the projection of the display light L in the display device 10 for a vehicle will be explained with reference to FIGS. 1 and 2.

In the display device 10, the display light L displayed on the display source 11 is reflected by the reflecting member 12 to go toward the prism 13. Then, as shown in FIG. 2, when the display light L enters the prism 13 with an angle γ, the display light L is reflected with an angle φ, and when the display light L goes to the upper surface 13a from the prism 13 with an angle β with respect to the normal line V1 of the upper surface 13a of the prism 13, the display light L goes out from the prism 13 being reflected with an angle α with respect to the normal line V1. That is, as shown in FIG. 1, the display light L goes to the projection point P1 of the projection area E of the windshield 3 and is reflected there to go toward the eye point EP.

According to the display device 10 for a vehicle as explained above, the prism 13, which reflects the display light L from the display source 11 toward the projection position P1 predetermined on the projection area E of the windshield 3, is arranged on a light path between the display source 11 and the aperture 21 of the instrument panel 2. Therefore, if the prism 13 is formed in a shape corresponding to a facing position of the display source 11 with respect to the instrument panel 2, the attaching position of the device body of the display device 10 can be changed depending upon an attachment limiting condition of the vehicle. Further, since the external light reflected or refracted on the upper and lower surfaces 13a, 13b of the prism 13 is reflected forward in the vehicle, therefore the external light can be shielded by the light shield wall 23 without making the light shield wall 23 high. That is, the display device 10 for a vehicle can be placed shifted backward within the instrument panel 2, therefore the external light such as sun light can be prevented from going to the windshield 3 due to the reflection by the prism 13. Therefore, the display device 10 can be easily mounted on a plurality of types of the vehicle having different shapes of the instrument panel 2. Further, since the light L3 coming out from the prism 13 is refracted backward in the vehicle with respect to the entering light L1, therefore the device body of the display device 10 can be placed at the rear side within the instrument panel 2, thereby preventing the interference with the body (for example, a cowl) of the device body of the display device 10 and deterioration of the forward field of view due to the placement of the device body of the display device 10 at the upper side from occurring.

Second Preferred Embodiment

In the first preferred embodiment described above, the aperture 21 of the instrument panel 2 is closed by the exterior glass 22. In the following, an example, in which the prism 13 itself functions as the exterior glass 22, will be explained.

Figure 3:
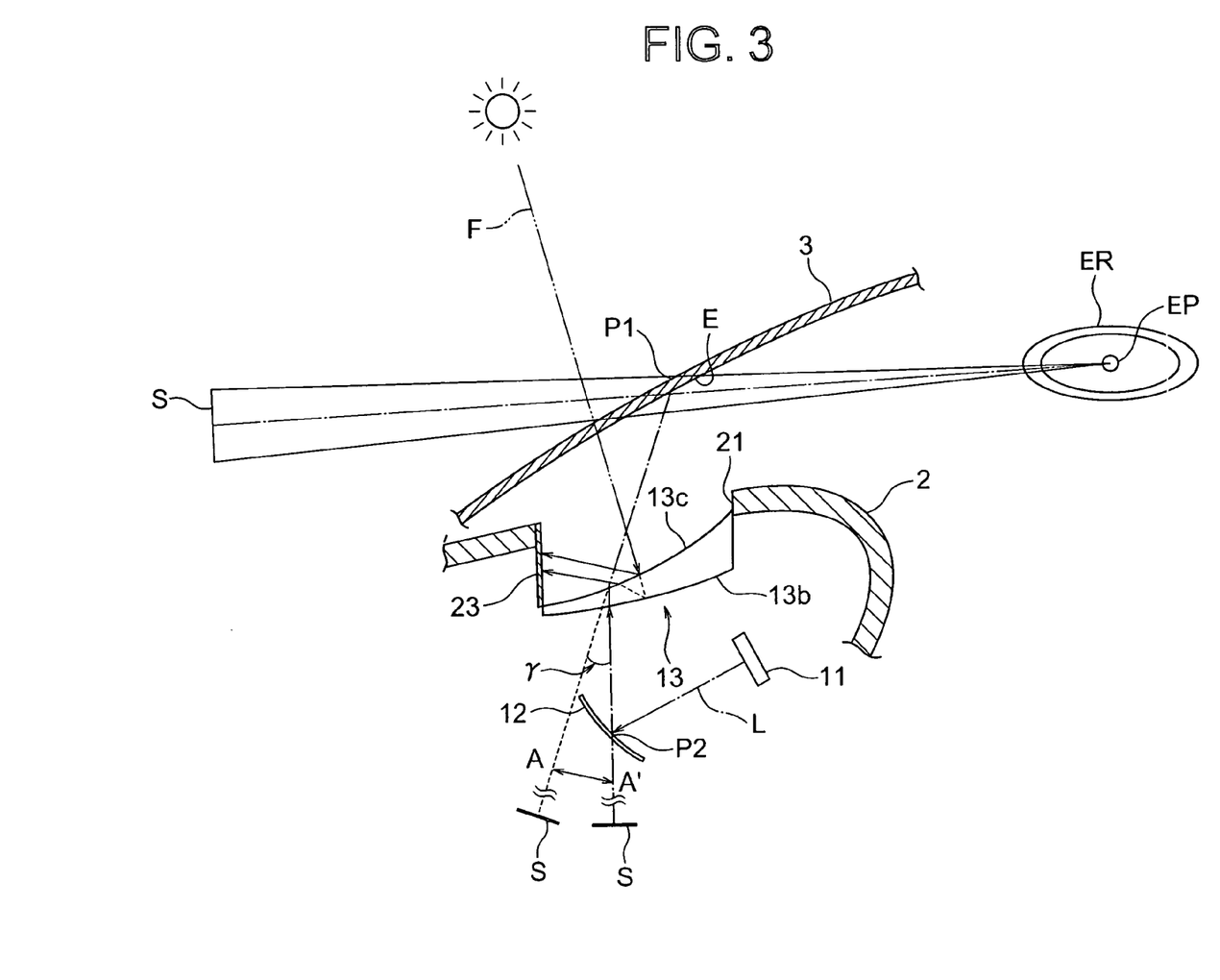
FIG. 3 illustrates a primary construction of a display device for a vehicle according to the second preferred embodiment of the present invention.

As shown in FIG. 3, a display device 10 for a vehicle includes a display source 11, reflecting member 12, prism 13 and light shield wall 23. The prism 13 is formed in a shape approximately equal to that of an aperture 21 of an instrument panel 2 so as to close the aperture 21 to prevent a contamination from entering therein. That is, the display device 10 makes the exterior glass 22 of the first preferred embodiment unnecessary.

Similarly to the first preferred embodiment, the prism 13 is formed in a wedge-shaped being tapered so as to have a thickness thereof at the rear part thereof being larger than that at the front part thereof according to the attaching position of the display source 11 in the instrument panel 2, so that the prism 13 refracts the transmitting display light L toward a predetermined position P1 on the projection area E, and is formed in a concave shape so that an upper surface 13c and a lower surface 13b of the prism 13 are inclined upward in a backward direction of the vehicle.

The upper surface 13c reflects the external light F passed through the windshield 3 in a direction (to the left side in FIG. 3) straying out of a course to the eye point EP. Further, the prism 13 is formed in such a shape that the external light F goes to the light shield wall 23 when the external light F entered the inside from the upper surface 13c is reflected in the inside of the prism 13 and comes out from the upper surface 13c. That is, the curved upper surface 13c of the prism 13, which condenses the external light F toward the light shield wall 23 in the instrument panel 2, functions as an external light reflecting surface. A surface of the light shield wall 23 is black or the like so as to prevent the external light F from being reflected.

Thus, since the upper surface 13c of the prism 13 is formed curved in such a manner that the external light F reflected on the upper surface 13c are condensed to the light shield wall 23, therefore a ghost image due to the external light F can be prevented from occurring and therefore, dazzling of a driver of the vehicle can be securely prevented from occurring.

When the visibility is deteriorated caused by a distortion or shrinkage of display of a virtual image S due to a shape of the windshield 3, the shape of the prism 13 may be formed non-spherical.

In the following, an example of action as to the projection of the display light L in the display device 10 for a vehicle will be explained with reference to FIG. 3.

In the display device 10 for a vehicle, the display light L displayed on the display source 11 is reflected by the reflecting member 12 and goes to the prism 13. When the display light L enters the prism 13 with an angle γ, the display light L is refracted with the angle φ, therefore the display light L is refracted in such a manner that the display light L coming out from the prism 13 goes toward the rear side of the vehicle compared to the display light L entering the prism 13. As a result, the display light L comes out from the surface 13c of the prism 13 toward the projection point P1 of the projection area E of the windshield 3 and is reflected at the projection point P1 so as to go to the eye point EP.

A part of the external light F passed through the windshield 3 is reflected by the upper surface 13c of the prism 13 and goes toward the light shield wall 23. The external light F entered the prism 13 is reflected by the lower surface 13b of the prism 13 and refracted by the upper surface 13c toward the front side of the vehicle so as to go toward the light shield wall 23. Thus, the external light F is prevented from going toward the eye point EP.

According to the display device 10 for a vehicle as explained above, since the prism 13, by which the display light L from the display source 11 is refracted toward the predetermined position P1 on the projection area of the windshield 3, is placed on the light path so as to close the aperture 21 of the instrument panel 2, therefore an attaching position of the device body of the display device 10 can be altered depending upon an attachment limiting condition of the vehicle by forming the prism 13 in a shape corresponding to the relative position of the display source 11 with respect to the instrument panel 2. Therefore, the display device 10 can be easily mounted on a plurality of types of the vehicle having different shapes of the instrument panel 2. Further, similarly to the first preferred embodiment, since the light L3 coming out from the prism 13 is refracted backward in the vehicle with respect to the entering light L1, therefore the device body of the display device 10 can be placed at the rear side within the instrument panel 2, thereby preventing the interference with the body (for example, a cowl) of the device body of the display device 10 and deterioration of the forward field of view due to the placement of the device body of the display device 10 at the upper side from occurring.

Since the prism 13 closes the aperture 21 of the instrument panel 2, therefore the exterior glass 22 of the first preferred embodiment is unnecessary, and therefore an attaching position of the device body of the display device 10 can be altered depending upon an attachment limiting condition of the vehicle.

Further, since the external light F passed through the windshield 3 is reflected by the prism 13 in a direction straying out of a course to the eye point EP, therefore a ghost image due to the external light F can be prevented from occurring and therefore, dazzling of a driver of the vehicle can be securely prevented from occurring.

In the preferred embodiment described above, the display device 10 for a vehicle directly projects the display light L on the projection area E of the windshield 3. However, instead, in the present invention, the display light L may be reflected toward the eye point EP by a combiner instead of the windshield 3.

In the preferred embodiment described above, the display device 10 for a vehicle includes the reflecting member 12. However, instead, in the present invention, the display light L from the display source 11 may be allowed to directly enter the prism 13 without using the reflecting member 12.

The aforementioned preferred embodiments are described to aid in understanding the present invention and variations may be made by one skilled in the art without departing from the spirit and scope of the present invention.

What is claimed is:

1. A display device for a vehicle comprising:
    a display source provided in an instrument panel of the vehicle;
    a prism provided on a light path between the display source and an aperture of the instrument panel and refracting display light of an image displayed on the display source toward a predetermined position backward in the vehicle; and
    a light shield wall facing the prism and situated in front of the prism in the vehicle,
    wherein the prism is formed in a wedge-shape being tapered so as to have a thickness at the rear part thereof being larger than that at the front pan thereof, the prism has a refractive index $n_2$ and a surface refractive index $n_1$ so that light coming out from the prism is refracted backward with respect to the entering light, and the prism is formed in a shape inclined upward in a backward direction of the vehicle so that external light reflected on upper and lower surfaces of the prism goes toward the light shield wall which prevents the external light from being reflected,
    wherein (a) a virtual image of the image projected on a projection area of a windshield of the vehicle, onto which area the display light from the prism is projected and (b) a front view of the vehicle to be seen from an eye point of the vehicle through the windshield are seen in a superimposed manner.

2. The display device for a vehicle according to claim 1 further comprising a reflecting member provided in the instrument panel and reflecting the display light from the display source toward the projection area, wherein the prism is situated on a light path between the reflecting member and the aperture and formed so as to refract the display light toward a projection position of the projection area.

3. The display device for a vehicle according to claim 1, wherein the prism is provided so as to close the aperture.

4. The display device for a vehicle according to claim 1, wherein the prism includes an external light reflecting surface formed so as to reflect the external light passed through the windshield in a direction straying out of a course to the eye point.

* * * * *